United States Patent [19]

Miknyocki et al.

[11] Patent Number: 4,541,547
[45] Date of Patent: Sep. 17, 1985

[54] TOKEN OR CARD DISPENSER

[76] Inventors: Ronald J. Miknyocki, 500 W. State St., East Tawas, Mich. 48730; William A. Lambert, 9708 Buckingham, Allen Park, Mich. 48101

[21] Appl. No.: 544,221

[22] Filed: Oct. 21, 1983

[51] Int. Cl.$^4$ .............................................. B65G 59/06
[52] U.S. Cl. .................................... 221/260; 133/5 R
[58] Field of Search ................... 133/5 R, 5 A, 5 B, 6; 221/276, 274, 260

[56] References Cited

U.S. PATENT DOCUMENTS

| | | | |
|---|---|---|---|
| 486,201 | 11/1892 | Tower | 133/5 R |
| 1,420,377 | 6/1922 | Hopkins | 133/5 A |
| 2,936,769 | 5/1960 | Damon | 133/5 R |
| 3,169,660 | 2/1965 | Holzwarth et al. | 221/260 X |
| 3,401,704 | 9/1968 | Davin | 221/276 X |

FOREIGN PATENT DOCUMENTS 667454  5/1939  Fed. Rep. of Germany ...... 221/260

Primary Examiner—Stanley H. Tollberg
Attorney, Agent, or Firm—Cullen, Sloman, Cantor, Grauer, Scott & Rutherford

[57] ABSTRACT

A chip, token, coin or card dispenser includes an upright storage tube for a stack of tokens of predetermined shape and is mounted upon a base plate, with the lower end of the tube spaced above a depressed token platform in the base plate defining a token slot. An ejector strip extends transversely of the tube and at one end is guidably mounted upon the base plate under the tube and in registry with the token slot. A spring biased actuator is connected to the other end of the ejector strip and upon movement of the ejector strip in one direction dispenses the lowermost token outwardly of the token slot and upon movement of the ejector strip in the opposite direction permits the next lowermost token to drop into the token platform.

6 Claims, 8 Drawing Figures

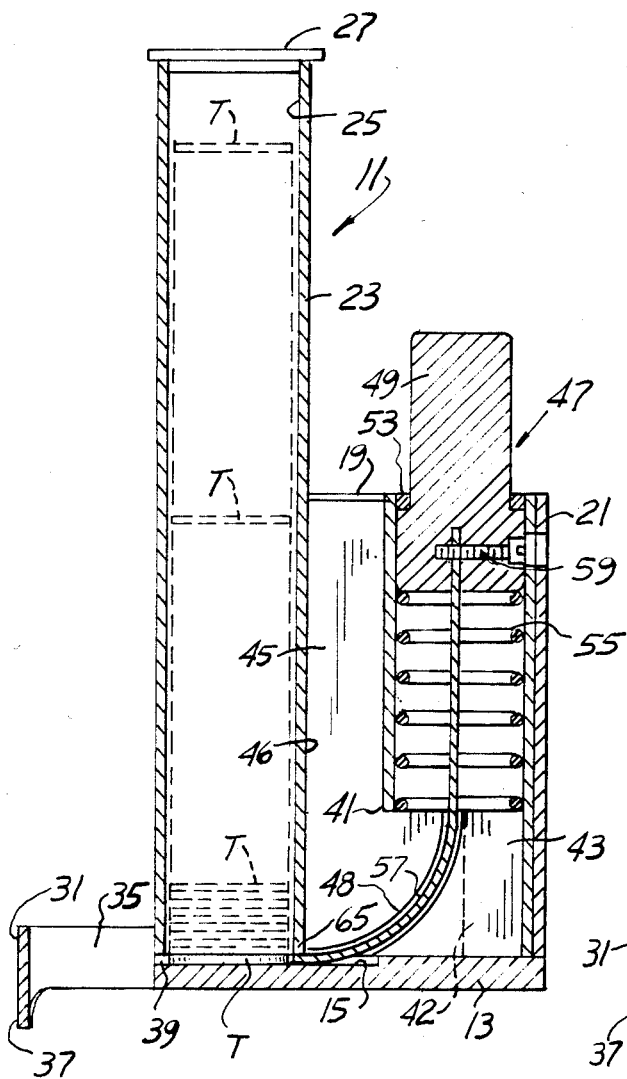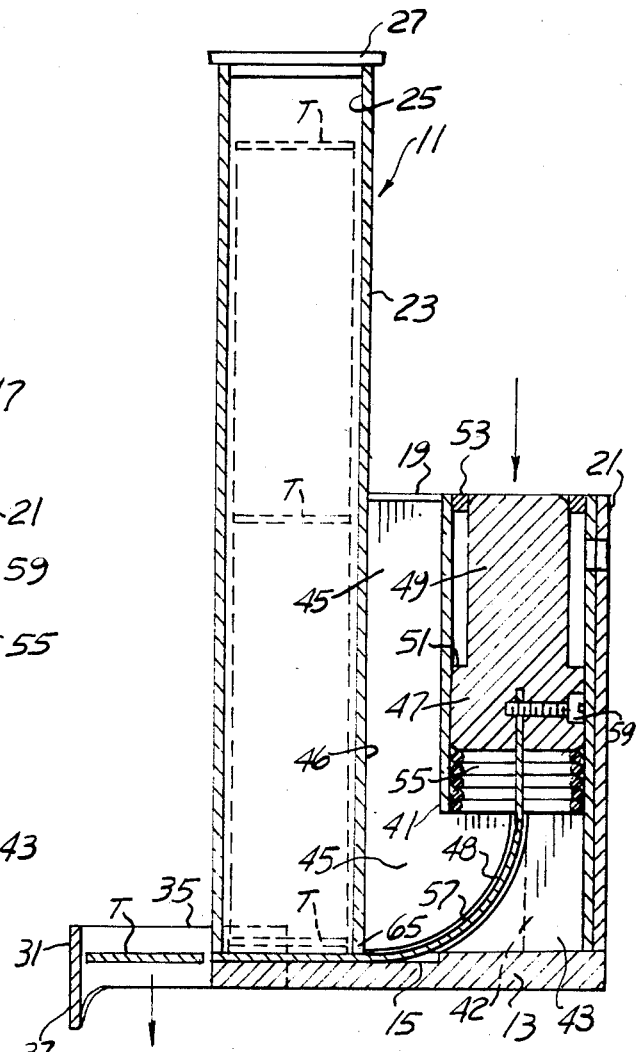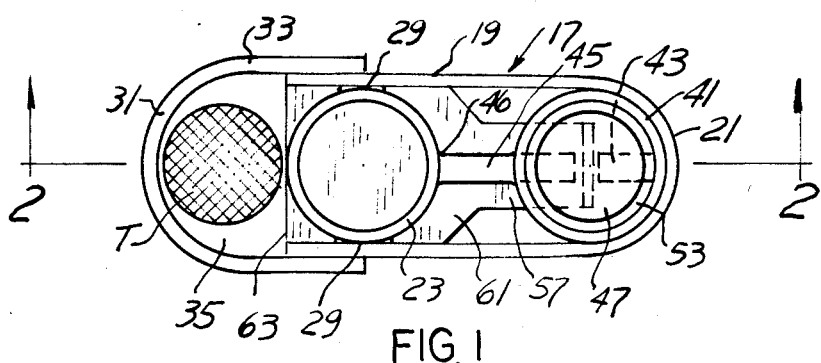

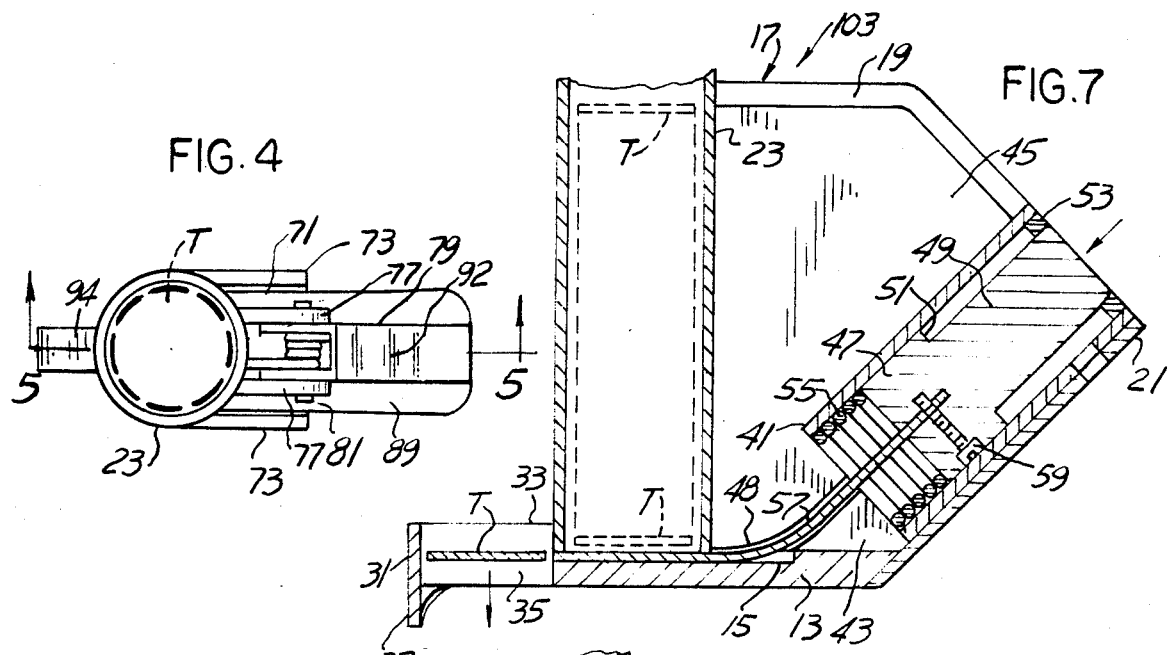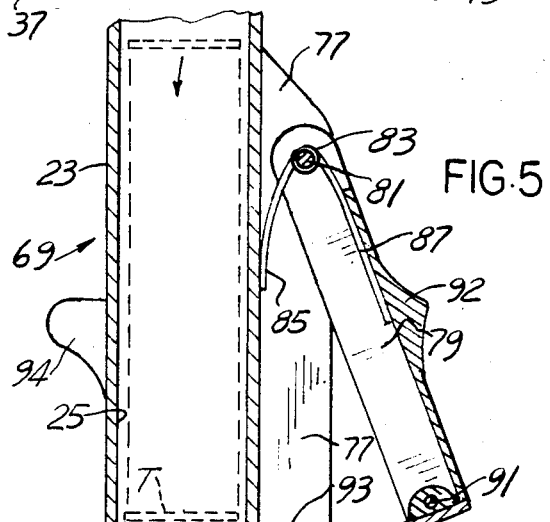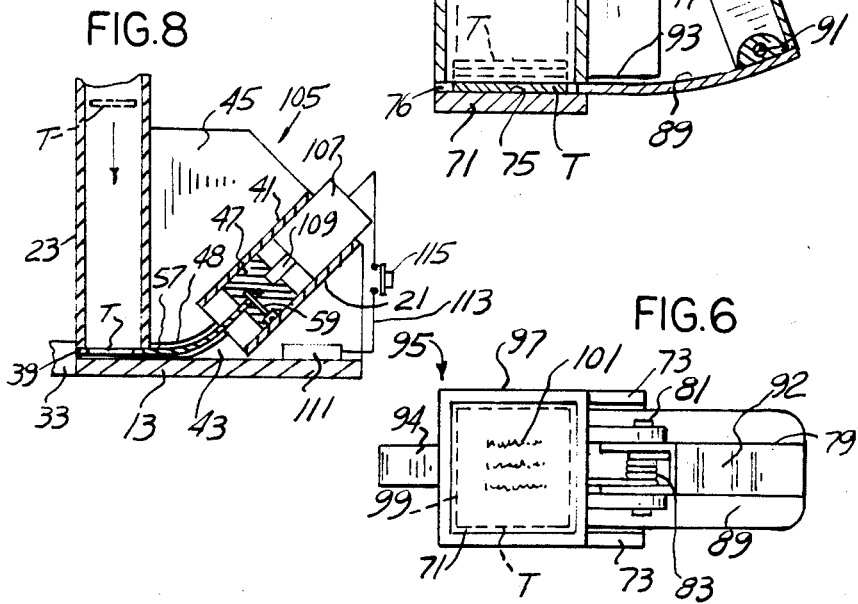

TOKEN OR CARD DISPENSER

BACKGROUND OF THE INVENTION

In certain types of games such as bingo, though not limited thereto, a plurality of uniform chips, tokens, coins or cards are employed in the playing of the game. Often the tokens, chips, coins or cards are in a pile upon a table or in a bowl and can be grasped and picked up one at a time and placed where required. Often in playing bingo, for example, a person will have a plurality of cards and wherein it is difficult sometimes to manually hold sufficient tokens at one time and to successively apply them to the corresponding cards as the numbers are called.

Heretofore, there have been difficulties involved in manually grasping one or a plurality of tokens or coins and for the accurate positioning and placing of the token at a specific location upon game board pursuant to a predetermined pattern and successive calling of numbers as in the case of bingo and possibly other games.

SUMMARY OF THE INVENTION

It is an object of the present invention to provide a manually operable token or card dispenser wherein a plurality of tokens are stored in the vertical stack within a dispenser tube and wherein tokens are dispensed one at a time from the lowermost of the stack.

An important feature is to provide an upright, preferably transparent, open ended tube upon a suitable support or housing upon a base and spaced above a base plate so that successively the bottom-most token from the stack may be mechanically dispensed from the base plate for application onto a game board.

It is contemplated in reference hereafter to tokens that the word token includes as equivalent the use of a chip or coin or a card of a predetermined shape and wherein the tube storing a stack of such tokens is of corresponding shape and slightly larger so that the stack is loosely positioned within the tube.

It is an important feature to provide upon a base a suitable support or housing for mounting an open ended tube, preferably transparent, within which a plurality of tokens are stacked and wherein the tokens are dispensed from the bottom of the tube, one at a time.

It is another feature to provide a token or card dispenser wherein the token storage tube is mounted upon the base plate and spaced above a vertically recessed token platform, a distance equal to or slightly larger than the height of a token; and wherein the bottom-most token at all times rests upon the token platform and wherein the tokens may be ejected one at a time from the tube onto a game board.

A further feature is to provide an ejector strip which extends transversely to the tube and at its leading end is guidably mounted upon the token platform and in registry with a token in a token slot between the storage tube and the token platform.

A further feature employs a manual or electronic means for advancing the ejector strip a distance sufficient to eject the token from the token platform, and the ejector strip will automatically retract to permit the next lowermost token to drop into the token platform and token slot so as to be in registry with the ejector strip.

A further feature contemplates a manually operable means by which the ejector strip, preferably flexible, is manually projected first in one direction for dispensing the lowermost token from the token slot in the base plate and which will automatically return to a retracted position to permit the next lowermost token to drop down into the token slot.

As a further feature manual application of the ejector strip is against a spring biasing means so that upon removal of manual force, the ejector strip returns to its initial position ready for the next ejection of a token.

A further feature contemplates the use of a housing secured upon the base plate and into which a token support tube is mounted and secured upon a base plate and above a depressed token platfore thereon and wherein there is employed a manually reciprocal plunger connected to a flexible ejector strip. Depression of the plunger will cause the ejector strip to move in one direction within an arcuate guide slot to dispense the token. A spring means is provided to automatically return the plunger to its initial inoperative position with the ejector strip sufficiently retracted to permit dropping down of the next lowermost token upon the token platform into a token slot.

These and other objects and features will be seen from the following Specification and claims in conjunction with the appended drawings.

THE DRAWINGS

FIG. 1 is a plan view of the present chip, token, coin or card dispenser.

FIG. 2 is a vertical section taken in the direction of arrows 2—2 of FIG. 1, with the ejector strip advanced to dispense a token.

FIG. 3 is a similar view with the ejector strip and plunger spring biased to an inoperative retracted position.

FIG. 4 is a plan view of a modified token dispenser.

FIG. 5 is a fragmentary section taken in the direction of arrows 5—5 of FIG. 4.

FIG. 6 is a plan view of a modified dispenser similar to the dispenser shown in FIG. 4.

FIG. 7 is a fragmentary sectional view similar to FIG. 2 of a modified token dispenser.

FIG. 8 is a fragmentary sectional view similar to FIG. 2 of a modified token dispenser.

It will be understood that the above drawings illustrate merely a preferred embodiment of the invention and that other embodiments are contemplated within the scope of the claims hereafter set forth.

DETAILED DESCRIPTION OF AN EMBODIMENT OF THE INVENTION

Referring to the drawing, FIGS. 1, 2 and 3, a chip, token, coin or card dispenser is generally indicated at 11 and includes a base plate 13 adaptable for mounting upon a suitable support or table. One end of said base plate has a downwardly depressed token platform 15 which is displaced from the top of said base plate.

Housing 17, of general U-shape, includes a pair of opposed spaced upright side walls 19 and a semi-circular end wall 21. Said housing is mounted upon base plate 13 and suitably secured thereto as by welding or cement.

Upright token storage tube 23 with bore 25 is preferably constructed of plastic and is transparent, enclosing a stack of tokens T which may be coins, chips or cards having a cross-sectional shape similar to and slightly smaller than said bore. Hereafter with reference to the stack of tokens, it is contemplated as equivalent that the token could be in the form of a chip, a coin or a card or cardboard in a form circular in cross-section, polygonal, rectangular or square, FIG. 6.

Removable friction cap 27 is applied at the upper end of token storage tube 25. Said tube in an upright position is mounted upon base plate 13 directly above token platform 15 and is suitably secured at its sides to said base plate by cement or welding 29, FIG. 1. Projecting from one end of base plate 13 is a token guide stop outlet 31 of general U-shape in plan which includes side walls 33 which bear against base plate 13 and are suitably secured thereto as by welding, cement or as an integral part thereof.

The token stop guide outlet 31 includes an aperture 35 outwardly of base plate 13 and upon one side has a depending token guide and stop 37 limiting ejection of the token T, FIG. 1, so that the token falls by gravity through the aperture 35 upon a specific location upon a game card, as in bingo, for example.

The token dispenser is hand held and upon dispensing of the token, it is positioned so as to be directly over a numbered square corresponding to the number called off, should it be a bingo game or other game.

The token storage tube 23 is mounted and secured upon base plate 13 within the housing 19 and its lower end is spaced from token platform 15 a distance slightly greater than the height of the corresponding token. This defines a token or feed slot 39 between the lower end of said tube and token platform 15.

Upright plunger sleeve 41 is spaced above base plate 13 and includes a depending semi-circular support 42 mounted upon base plate 13 and secured thereto.

Tube support plate or web 45 is connected to or forms a part of guide tube 41 and extends along its height and the height of tube support 42. A portion 43 of support 45 extends under the center of tube 41 to the inner wall of tube support 42 and is secured thereto by cement or otherwise.

Plate 45 upon its other upright edge at 46 extends along the height of tube 23 and is secured thereto by cement or as a part thereof. Plate 45 has an arcuate slot 48 therein and at its lower end terminates above token platform 15. The upper end of the slot is in registry with the central axis of guide tube 41, FIG. 2.

Manually operable cylindrical plunger 47 is slidably positioned within sleeve 41 and at its upper end has a shank 49 of reduced diameter defining a stop shoulder 51.

Apertured stop washer 53 is secured within the upper end of plunger sleeve 41 and is adapted to slidably receive shank 49 and to limit upward movement of the plunger. For this purpose stop shoulder 51 upon said plunger is in operative registry with said washer, FIG. 3. A coiled compression spring 55, FIG. 3, is nested within the plunger sleeve 41 and rests upon plate 43. Its upper end supports plunger 47 maintaining in its normal retracted position.

Elongated flexible ejector strip 57, preferably constructed of a plastic material, at one end extends into an axial slot within plunger 47 and is suitably secured thereto by fastener 59. Said strip guidably extends through slot 48 in plate 43-45. The lower end of the ejector strip terminates in a pusher 61 which is flat and which overlies and extends into the token platform 15 and has a transverse pusher edge 63.

Said pusher edge is in registry with the lowermost token T within the token or feed slot 39. A forward portion of ejector strip 57-61 underlies a small portion of the adjacent wall of storage tube 23 as at 65. Slot 48 receives and guides the ejector strip so that it remains at all times in registry with the lowermost of the stack of tokens T, FIG. 3 and below the lower end of said tube.

On manual compression of the plunger, FIG. 2, the ejector strip is advanced longitudinally through slot 48 operatively engaging token T and ejecting it into the token stop guide outlet 31. Here it engages the stop or guide 37 and drops vertically as shown by the arrow, FIG. 2.

In use upon downward compression of plunger 47 by the user, the token stop guide outlet 31-37 is directly postioned above the square on a game board which corresponds to a number called by the announcer in a bingo game, for illustration. The token stop guide outlet 31-37 provides a means for accurately positioning the dispensed token to vertically overlie the correct numbered square. Just as soon as manual pressure is removed from the plunger, the compressed coil spring 55, FIG. 2, expands retracting plunger 47 and the connected ejector strip to the position shown in FIG. 3.

MODIFIED TOKEN DISPENSER

A modified chip, token, coin or card dispenser is generally indicated at 69, FIGS. 4 and 5 and includes a base plate 71 mounted upon a suitable support or table, and includes side flanges 73 defining a token platform 75.

Upright token storage tube 23 having a bore 25 similar to tube 23 of FIG. 3 is mounted upon side flanges 73 and secured to said base plate by cement or otherwise. Spaced side plates 77, are suitably secured to said tube along its height as by welding or using a suitable cement or molded as a part of the tube. The tube 23 at its lower end is spaced above token platform 75 a short distance to define a token slot 76. Said slot is adapted to receive the lowermost token T from within storage tube 23. The upper end of ejector arm 79 is positioned between side plates 77 and is pivotally connected thereto by pivot pin 81.

Torsion spring 83 is mounted around pivot pin 81, at one bears against tube 23 at 85 and at its other end bears against arm 79 at 87 normally biasing the arm to a retracted position, FIG. 5.

The elongated and flexible ejector strip 89, preferably made of a plastic material, is anchored at its outer end at 91 upon the lower end of ejector arm 79. The forward end of the ejector strip when in a retracted position extends under a guide retainer 93, being the lower ends of walls 77. Retainer 93 serves to retain and to guide the ejector strip 89 for advanced movement along the feed slot 76 above token platform 75. This is for the purpose of ejecting the lowermost token when arm 79 has been compressed with respect to tube 23. Such forward movement of the ejector strip advances or pushes the lowermost token T laterally outward of token slot 76 in base plate 71 for dropping down onto a predetermined location of a game board adjacent to which the dispenser is manually held.

Upon removing manual pressure from ejector arm 79 the ejector arm under the action of torsion spring 83 returns to a retracted position, FIG. 5, awaiting the next ejection or dispensing of the next lowermost token which drops down to the position shown just as soon as the preceding token has been fully dispensed and the ejector strip retracted.

MODIFICATION

A modified chip, token, coin or card dispenser is shown at 95, in FIG. 6. The construction is substantially the same as above described with respect to FIGS. 4 and 5, except that the storage tube 97 is polygonal in shape, and in the illustrative embodiment square and preferably transparent.

A stack of tokens or cards or cardboard units, the same shape such as square, are indicated at 99 loosely stored in a stack within tube 97. The cards contain a predetermined indicia 101 for playing a particular game in accordance with specific instructions.

FIG. 6 illustrates that the token or card dispensing tube may be of any desired cross-sectional shape with the tokens dispensed of the same shape, though a little smaller in dimension so as to move freely upon the interior of the square tube 97. The operation is the same and wherein upon manual application to the ejector arm 79, the lowermost token card will be dispensed and ejected out from the corresponding feed slot 76 and laterally outward of base plate 71.

A finger piece 92 in arm 79 cooperates with the thumb piece 94 upon tube 23 to facilitate holding and actuating the token dispenser.

MODIFICATION

A modified token dispenser 103 is fragmentarily shown in FIG. 7. The construction and operation is the same as described with respect to FIGS. 1 and 2. Housing end wall 21 is inclined at an acute angle preferably 45° approximately. Plunger sleeve 41 is similarly inclined.

MODIFICATION

Referring to FIG. 8, a modified token dispenser 105 is shown wherein instead of a manually operable plunger as in FIG. 2, the plunger 47 is electronically activated such as by a solenoid in an electrical circuit. For this purpose, FIG. 8 shows the plunger 47 within the guide sleeve 41, with no spring. The solenoid 107 is positioned and retained within guide tube 41 and includes a spring biased shaft 109 which is normally retracted and at its free end is connected to plunger 47 to maintain the plunger in a normally retracted position. An electrical circuit 113 includes a battery 111 and a push button 115 connected to solenoid 107. Intermittent activation of the switch 115 by the user will effect corresponding downward movement of plunger 47 and the associated ejector strip 57 to function exactly as above described.

The only difference herein is that instead of being manually operable, the token dispenser is electronically operable.

Having described our invention, reference should now be had to the following claims:

We claim:

1. A chip, token, coin and card dispenser comprising a base plate having a depressed token platform thereon; an upright open ended tube of predetermined cross-sectional shape adapted to store a stack of tokens of the same shape, overlying mounted upon and secured to said base plate above said platform, said platform defining a token slot;

an ejector strip extending transversely of said tube at its leading end guidably mounted upon said base plate within said token platform, in registry with said token slot and with the lowermost token upon said platform within said slot;

operable reciprocal means connected to the tube and to the other end of said ejector strip, upon movement in one direction advancing said strip ejecting said lowermost token from said base plate, and upon movement in the opposite direction retracting said strip permitting the next lowermost token to drop into said token slot upon said base plate;

said ejector strip being flexible;

said manually operable means including a guide tube laterally spaced from said token tube and secured thereto and mounted upon said base plate;

a manually operable plunger guidably mounted within said guide tube at one end connected to said ejector strip;

a compression spring supported within said guide tube bearing against and normally holding said plunger and ejector strip retracted;

manual advancing of said plunger compressing said spring and advancing said ejector strip;

said plunger having a shank of reduced diameter defining a stop shoulder, and an apertured washer secured within the upper end of said guide tube limiting retraction of said plunger.

2. A chip, token, coin and card dispenser comprising a base plate having a depressed token platform thereon;

an upright open ended tube of predetermined cross-sectional shape adapted to store a stack of tokens of the same shape, overlying, mounted upon and secured to said base plate above said platform, said platform defining a token slot;

an ejector strip extending transversely of said tube at its leading end guidably mounted upon said base plate within said token platform, in registry with said token slot and with the lowermost token upon said platform within said slot;

operable reciprocal means connected to the tube and to the other end of said ejector strip, upon movement in one direction advancing said strip ejecting said lowermost token from said base plate, and upon movement in the opposite direction retracting said strip permitting the next lowermost token to drop into said token slot upon said base plate;

and an apertured token guide stop outlet secured to and spaced outwardly of said base plate;

said tokens progressively engaging and dropping through said guide outlet.

3. In the token dispenser of claim 2, a pair of laterally spaced support plates extending along said tube and secured thereto and at their lower ends spaced above said base plate, said reciprocal means including a token ejector swing arm guidably interposed between and at its upper end pivotally mounted upon said support plates and at its lower end secured to said ejector strip, said ejector strip extending laterally outward of said support plates and movable thereunder.

4. A chip, token, coin and card dispenser comprising a base plate having a depressed token platform thereon;

an upright open ended tube of predetermined cross-sectional shape adapted to store a stack of tokens of the same shape, overlying, mounted upon and secured to said base plate above said platform, said platform defining a token slot;

an ejector strip extending transversely of said tube at is leading end guidably mounted upon said base plate within said token platform, in registry with said token slot and with the lowermost token upon said platform withn said slot;

operable reciprocal means connected to the tube and to the other end of said ejector strip, upon movement in one direction advancing said strip ejecting said lowermost token from said base plate, and upon movement in the opposite direction retracting said strip permitting the next lowermost token to drop into said token slot upon said base plate;

said ejector strip being flexible;

said operable means including a guide tube laterally spaced from said token tube and mounted upon said base plate;

a plunger slidably mounted within said guide tube at one end connected to said ejector strip;

a solenoid mounted in said guide tube including a spring biased normally retracted shaft connected to said plunger;

and an electrical circuit including a battery and manually operable switch connected to said solenoid for effecting controlled energization thereof and corresponding reciprocal movements of the ejector strip.

5. In the token dispenser of claim 4, and an upright support plate secured to said base plate, interconnecting and secured to said token tube and guide tube and extending under said guide tube;

there being an arcuate guide slot in said support plate extending from said guide tube to said token platform guidably receiving said ejector strip.

6. In the token dispenser of claim 1, a housing of U-shape extending around said guide tube and over a part of said token tube secured upon said base plate, to said guide tube and to said to said token tube.

* * * * *